United States Patent
Liu et al.

(10) Patent No.: US 12,315,251 B2
(45) Date of Patent: May 27, 2025

(54) METHOD FOR PROCESSING HYPERSPECTRAL IMAGES

(71) Applicant: SHANGHAI INSTITUTE OF TECHNICAL PHYSICS CHINESE ACADEMY OF SCIENCES, Shanghai (CN)

(72) Inventors: Yin-Nian Liu, Qidong (CN); Yue Xu, Qidong (CN); De-Xin Sun, Qidong (CN); Jian Liang, Qidong (CN)

(73) Assignee: Shanghai Institute of Technical Physics, Chinese Academy of Sciences, Shanghai (CN)

(*) Notice: Subject to any disclaimer, the term of this patent is extended or adjusted under 35 U.S.C. 154(b) by 470 days.

(21) Appl. No.: 17/744,106

(22) Filed: May 13, 2022

(65) Prior Publication Data

US 2022/0270362 A1   Aug. 25, 2022

Related U.S. Application Data

(63) Continuation of application No. PCT/CN2020/126976, filed on Nov. 6, 2020.

(30) Foreign Application Priority Data

Nov. 14, 2019 (CN) ................. 201911111365.0
Apr. 16, 2020 (CN) ................. 202010299752.8

(51) Int. Cl.
  *G06V 20/10* (2022.01)
  *G06T 5/70* (2024.01)
  *G06V 20/13* (2022.01)

(52) U.S. Cl.
  CPC .............. *G06V 20/194* (2022.01); *G06T 5/70* (2024.01); *G06V 20/13* (2022.01); *G06T 2207/10036* (2013.01)

(58) Field of Classification Search
  CPC ........ G06V 20/194; G06V 20/13; G06V 10/58; G06T 5/70; G06T 2207/10036; G01J 3/00; G01J 9/00
  See application file for complete search history.

(56) References Cited

U.S. PATENT DOCUMENTS 11,538,723 B2 * 12/2022 Chen ...................... G01N 21/73

FOREIGN PATENT DOCUMENTS

CN    101598798 A    12/2009
CN    107727231 A    2/2018
(Continued)

OTHER PUBLICATIONS

B. -L. Hu, J. Zhang, K. -Q. Cao, S. -J. Hao, D. -X. Sun and Y. -N. Liu, "Research on the Etalon Effect in Dispersive Hyperspectral VNIR Imagers Using Back-Illuminated CCDs," in IEEE Transactions on Geoscience and Remote Sensing, vol. 56, No. 9, pp. 5481-5494, Sep. 2018, (Year: 2018).*
(Continued)

*Primary Examiner* — Vu Le
*Assistant Examiner* — Jack Peter Kraynak
(74) *Attorney, Agent, or Firm* — HOVEY WILLIAMS LLP

(57) ABSTRACT

A method for processing a hyperspectral image, comprising: a first correction step for extracting a curve of spectral dimension of an initial spaceborne hyperspectral cube image for low-pass filtering so as to obtain initial correction coefficients; an optimization step for optimizing and compensating the initial correction coefficients according to the ripple period of spatial dimension of the pixel in each band, so as to obtain the optimized correction coefficients of the hyperspectral cube image; and a second correction step for obtaining a corrected hyperspectral image based on the optimized correction coefficients.

6 Claims, 8 Drawing Sheets

(56) References Cited

FOREIGN PATENT DOCUMENTS

| CN | 110837090 A | 2/2020 |
|---|---|---|
| CN | 111476738 A | 7/2020 |
| WO | 2017006314 A1 | 1/2017 |

OTHER PUBLICATIONS

Hu, B., Sun, D., & Liu, Y. (2018). A Novel Method to Remove Fringes for Dispersive Hyperspectral VNIR Imagers Using Back-Illuminated CCDs. Remote Sensing, 10(1), 79. https://doi.org/10.3390/rs10010079 (Year: 2018).*

Werle, P. "Accuracy and precision of laser spectrometers for trace gas sensing in the presence of optical fringes and atmospheric turbulence." 2011. Appl. Phys. B 102, 313-329. (Year: 2011).*

E. M. Malumuth et al., "Removing the fringes from space telescope imaging spectrograph slitless spectra", Feb. 2003, Publications Astronomical Soc. Pacific, vol. 115, No. 804, pp. 218-234. (Year: 2003).*

G. Corsini, M. Diani and T. Walzel, "Striping removal in MOS-B data", May 2000, IEEE Trans. Geosci. Remote Sens., vol. 38, No. 3, pp. 1439-1446. (Year: 2000).*

Hu, Binlin. "Research on the Etalon Effect in Dispersive Hyperspectral Imagers." Chinese Doctoral Dissertations Full-text Database, Engineering Science & Technology II, vol. 2019, No. 05, May 15, 2019; English Abstract.

Chen, Jianwu. "Research on Driving and Information Processing Technology of High-Frame-Rate Backside-Illuminated CCD in Space." Chinese Doctoral Dissertations Full-text Database, Engineering Science & Technology II, vol. 2016, No. 06, Jun. 15, 2016; English Abstract.

International Search Report in PCT/CN2020/126976; Jan. 27, 2021.

* cited by examiner

EXTRACTING A CURVE OF SPECTRAL DIMENSION OF AN INITIAL SPACEBORNE HYPERSPECTRAL CUBE IMAGE FOR LOW-PASS FILTERING SO AS TO OBTAIN INITIAL CORRECTION COEFFICIENTS

OPTIMIZING AND COMPENSATING THE INITIAL CORRECTION COEFFICIENTS ACCORDING TO A RIPPLE PERIOD OF SPATIAL DIMENSION OF A PIXEL IN EACH BAND, SO AS TO OBTAIN OPTIMIZED CORRECTION COEFFICIENTS OF THE HYPERSPECTRAL CUBE IMAGE

OBTAINING A CORRECTED HYPERSPECTRAL IMAGE BASED ON THE OPTIMIZED CORRECTION COEFFICIENTS

FIG. 4

EXTRACTING AN AMPLITUDE DISTRIBUTION CURVE OF SPATIAL INTERFERENCE RIPPLE FOR A SELECTED BAND FROM A HYPERSPECTRAL IMAGE CUBE DATA, AND THEN CALCULATING THE NUMBER OF SPATIAL RIPPLE PERIODS CORRESPONDING TO THE AMPLITUDE DISTRIBUTION CURVE OF SPATIAL INTERFERENCE RIPPLE FOR THE BAND BY TAKING A PEAK AND A VALLEY OF THE AMPLITUDE DISTRIBUTION CURVE OF SPATIAL INTERFERENCE RIPPLE FOR THE BAND AS A SPATIAL RIPPLE PERIOD

LOW-PASS FILTERING THE AMPLITUDE DISTRIBUTION CURVE OF SPATIAL INTERFERENCE RIPPLE FOR THE BAND BY TAKING A CERTAIN TIMES OF THE NUMBER OF SPATIAL RIPPLE PERIODS CORRESPONDING TO THE AMPLITUDE DISTRIBUTION CURVE OF SPATIAL INTERFERENCE RIPPLE FOR THE BAND AS A CUT-OFF FREQUENCY, TO OBTAIN A LOW-PASS FILTERED AMPLITUDE DISTRIBUTION CURVE OF SPATIAL INTERFERENCE RIPPLE FOR THE BAND

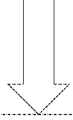

OBTAINING A FINENESS COEFFICIENT OF RIPPLE CURVE OF ETALON EFFECT FOR THE BAND, BY TAKING AN AVERAGE VALUE OF LOCAL MAXIMUM POINTS OF PEAKS OF THE LOW-PASS FILTERED AMPLITUDE DISTRIBUTION CURVE OF SPATIAL INTERFERENCE RIPPLE FOR THE BAND AS A PEAK VALUE OF RIPPLE OF ETALON EFFECT, AND TAKING AN AVERAGE VALUE OF LOCAL MINIMUM POINTS OF VALLEYS OF THE LOW-PASS FILTERED AMPLITUDE DISTRIBUTION CURVE OF SPATIAL INTERFERENCE RIPPLE FOR THE BAND AS A VALLEY VALUE OF THE RIPPLE OF ETALON EFFECT

FITTING ALL CURVE VALUES, EXCEPT FOR THE POSITIONS OF THE PEAKS AND VALLEYS, OF THE OBTAINED AMPLITUDE DISTRIBUTION CURVE OF SPATIAL INTERFERENCE RIPPLE FOR THE BAND SO AS TO GENERATE A RIPPLE CURVE OF ETALON EFFECT FOR THE BAND

FIG. 8

METHOD FOR PROCESSING HYPERSPECTRAL IMAGES

CROSS-REFERENCE TO RELATED APPLICATION

This application is a continuation of international application Serial Number PCT/CN2020/126976, filed Nov. 6, 2020, and claims priority to CN 202010299752.8 filed Apr. 16, 2020, and CN 201911111365.0 filed Nov. 14, 2019, all of which are incorporated by reference herein in their entireties.

FIELD

The present invention relates to the technical field of optical remote sensing imaging, and more particularly, to a method for processing a hyperspectral image.

BACKGROUND

The hyperspectral imaging technology is a remote sensing technology developed since 1980s. Different from traditional spectrometers, the hyperspectral imaging technology integrates imaging and spectroscopy (images merge with spectrums), with nanoscale hyperspectral resolution, simultaneously acquiring continuous fine spectral information of a target while obtaining two-dimensional spatial image information of the target, which greatly improves the detection ability of space remote sensing, and can be widely used in observations of land, atmosphere, ocean, etc.

At present, typical hyperspectral imaging systems mainly include the Hyperion carried by the launched US EO-1 satellite, the CHRIS carried by the launched ESA PROBA-1 satellite and the CRISM carried by the launched US MRO satellite, as well as the PRISM from Italy, the EnMAP/HIS from Germany, the Hero from Canada, the HyspIRI from the United States which are currently under research and development. The domestic hyperspectral imaging systems mainly include the hyperspectral imager carried by the launched HJ-1A satellite, the hyperspectral imagers carried by the launched Spark-01&02 satellites and the visible short-wave infrared hyperspectral camera carried by the launched "Gaofen-5" satellite. The aerospace hyperspectral satellite projects at home and abroad have acquired a large amount of valuable data in orbit, demonstrating the information acquisition capability of the aerospace hyperspectral imaging technology. The aerospace hyperspectral imaging technology has a very broad application prospect, and has a higher and higher requirement for the instrument performance (including spatial resolution, spectral resolution, quantification level, revisit period and other performance indicators). Among the performance indicators, the improvement of spectral resolution will effectively improve the ability of the instrument for distinguishing and identifying ground objects, making it possible to unmix the high-precision spectrum of mixed pixels, and in turn improving the depth and breadth of hyperspectral data processing and analysis application based on the spectral information of ground objects. However, as the spectral resolution increases, the energy of incident light received by a single spectral channel is further subdivided. Therefore, in order to realize a highly sensitive detection for the aerospace hyperspectral imagers, it is an important key to adopt a detector with high quantum efficiency.

The existing newly developed hyperspectral imagers in various countries mostly use back-illuminated CCD (with the structure as shown in FIG. 1) or CMOS detectors in the visible near-infrared band, and HgCdTe focal plane detectors in the short-wave infrared band (with the structure as shown in FIG. 2). With the improvement of the detector process, the scale of the detector has expanded to millions of pixels. However, due to the limitations of the existing manufacturing process and materials of the detector, inconsistency of response outputs between individual pixels of the infrared focal plane array is caused when the same uniform radiation field is input from the outside. This noise of inconsistency is usually called non-uniform noise ripple, which exhibits spatial noise or fixed pattern noise on the image, without obvious regularity. There are many mature correction methods of non-uniformity in the prior art, such as two-point method, high-pass filtering method, Kalman filtering algorithm, etc., all of which can effectively remove the non-uniform noise ripple of the hyperspectral data. In order to improve the energy collection efficiency of the detector, the depletion region (Si layer) of the detector is generally thinned. However, when the long-wavelength light has a depletion layer with an absorption length longer than its thickness, the incident light is reflected back and forth on the upper and lower surfaces of the depletion layer, resulting in interference ripples on the upper and lower surfaces of the depletion layer, which is just the Etalon effect. For example, the detector 1 of the short-wave infrared hyperspectral camera carried by the "Gaofen-5" satellite is formed by splicing several HgCdTe focal plane detectors 2, as shown in FIG. 3. The internal multilayer structure of the HgCdTe focal plane detector is shown in FIG. 2. However, due to the camera's high spectral resolution, narrow band range of the incident light and good singleness, if the absorption length of the incident light in the silicon layer 02 (the corresponding absorption path length when the silicon layer absorbs the incident photon 1/e) inside HgCdTe detector is larger than the thickness of the silicon layer 02, the interference ripples 05 will be generated by the incident light 00 on the upper and lower surfaces of the silicon layer 02.

The stripe noise caused by the Etalon effect exhibits a relatively low-frequency stripe noise in the spatial dimension, with a wider stripe range and the ripple amplitudes of adjacent pixels being close, which has obvious regularity. However, the interference ripples formed when the ripple of Etalon effect and the ripple of non-uniform noise are mixed will not only increase the non-uniform noise of the hyperspectral image, but also reduce the regularity of the Etalon effect while increasing difficulty of removing the non-uniform noise and Etalon effect of the hyperspectral images.

The interference ripples caused by the Etalon effect are divided into ripples of spectral dimension and ripples of spatial dimension. On one hand, in the direction of spectral dimension, due to the continuous change of the wavelength, the phase angle of interference changes accordingly, resulting in an interference distribution with different intensities in the direction of spectral dimension. On the other hand, in the direction of spatial dimension, the thickness of the silicon layer of each pixel cannot be completely consistent, and the precision of installation cannot be guaranteed during the splicing and assembly of multiple detector modules either, so that the angles of incident light of different pixels are different, which synthetically results in different phase angles of interference of the incident light in the direction of spatial dimension, thereby generating interference distributions of different intensities in the direction of spatial dimension. This will cause great trouble to the subsequent processing and quantitation research of the hyperspectral images.

In the prior art, methods for destroying the flatness of the front surface such as increasing the thickness of the silicon layer, designing an anti-reflection film for a specific wavelength band and "roughening" the front surface of the silicon layer are generally used to suppress the interference effect. However, although the initial wavelength and ripple amplitude generated by the Etalon effect can be significantly reduced by destroying the flatness of the front surface, the quantum efficiency of the corresponding band will be reduced. In addition, a post-correction method is also used to process the interference ripple of the image, in which Malumuth et al. has removed the Etalon effect existing in the STIS-G750L spectral imager in the Hubble Telescope by establishing a mathematical model of the interference ripple. This method needs to obtain in advance the thickness of each layer of medium inside the detector, the central wavelength of the incident light received by each pixel, the relationship between the refractive index and the wavelength, etc. However, in practical engineering applications, there are problems such as process error, wavelength drift and the like, so it is extremely difficult to obtain parameters with sufficient precision. Hu Binlin et al. have also proposed a two-step correction method, which involves a first step of removing the ripples of spectral dimension by a ridge based regression method, and a second step of removing the ripples of spatial dimension by using the strong space-spectral correlation of the hyperspectral data. This method is mainly used to process the data in the visible band. For the data in the infrared band, due to the influence of the Etalon effect, the spatial-spectral characteristics of some bands are weaker, and the correction effect is not ideal enough. From the above, it can be seen that the existing methods for removing interference ripples have limited application effect on removing the Etalon effect in infrared hyperspectral data.

Therefore, in order to ensure that the interference ripples of the hyperspectral image are effectively removed, the original spectral characteristics of the image are maintained, and the image quality and definition are improved, it is necessary to study how to separate the interferences caused by the Etalon effect and the non-uniformity in the interference ripples formed by the mixture of ripple of Etalon effect and ripple of non-uniform noise.

SUMMARY

According to an exemplary embodiment, the present invention provides a method for processing a hyperspectral image. The method comprises: a first correction step for extracting a curve of spectral dimension of an initial spaceborne hyperspectral cube image for low-pass filtering so as to obtain initial correction coefficients; an optimization step for optimizing and compensating the initial correction coefficients according to a ripple period of spatial dimension of a pixel in each band, so as to obtain optimized correction coefficients of the hyperspectral cube image; and a second correction step for obtaining a corrected hyperspectral image based on the optimized correction coefficients. The method according this exemplary embodiment allows to effectively remove the interference ripples of the hyperspectral image, and well maintain the original spectral characteristics, improving the image quality and definition, and laying a very good foundation for subsequent image analysis and application.

According to another exemplary embodiment, the present invention provides a method for processing a hyperspectral image. The method comprises: 1) extracting an amplitude distribution curve of spatial interference ripple for a selected band from a hyperspectral image cube data $DN_f(x, y, z)$, and then calculating the number of spatial ripple periods corresponding to the amplitude distribution curve of spatial interference ripple for the band by taking a peak and a valley of the amplitude distribution curve of spatial interference ripple for the band as a spatial ripple period; 2) low-pass filtering the amplitude distribution curve of spatial interference ripple for the band by taking a certain times of the number of spatial ripple periods corresponding to the amplitude distribution curve of spatial interference ripple for the band as a cut-off frequency, to obtain a low-pass filtered amplitude distribution curve of spatial interference ripple for the band; 3) obtaining a fineness coefficient F of ripple curve of Etalon effect for the band: $F=A_{max}/A_{min}-1$, by taking an average value of local maximum points of peaks of the low-pass filtered amplitude distribution curve of spatial interference ripple for the band as a peak value $A_{max}$ of ripple of Etalon effect, and taking an average value of local minimum points of valleys of the low-pass filtered amplitude distribution curve of spatial interference ripple for the band as a valley value $A_{min}$ of the ripple of Etalon effect; 4) fitting all curve values, except for the positions of the peaks and valleys, of the obtained amplitude distribution curve of spatial interference ripple for the band in step 1) by the following formula: $RA=\sqrt{1+F}/(1+F \sin^2(k_p \cdot x+b_p))$, so as to generate the ripple curve of Etalon effect for the band; where RA is a relative absorption rate of a silicon layer of a detector; $k_p$ is a gain coefficient of the interference phase angle generated by incidence of the incident light on the detector, which is a constant coefficient; $b_p$ is an offset coefficient of the interference phase angle generated by incidence of the incident light on the detector, which is a constant coefficient; where x is a spatial dimensional pixel ordinal number of the detector, x=1, 2, 3, . . . , x_max, where x_max is a maximum of the spatial dimensional pixel ordinal number of the detector; y is a number of sweep lines along a track, y=1, 2, 3, . . . , y_max, where y_max is a maximum of sweep lines along the track; z is an ordinal number of spectral dimensional band, z=1, 2, 3, . . . , z_max. The method of the another exemplary embodiment can effectively separate the ripple of Etalon effect out of the interference ripples formed by the mixture of ripple of Etalon effect and ripple of non-uniform noise, and can well maintain the original spectral characteristics of the image, thus providing a strong support for improving the image quality through image interference ripple correction, and laying a foundation for subsequent image analysis and application.

BRIEF DESCRIPTION OF THE DRAWINGS

The invention may be better understood by describing exemplary embodiments of the invention in conjunction with the accompanying drawings, in which:

FIG. 4 is a schematic flowchart of a method for processing hyperspectral images according to an exemplary embodiment of the present invention;

FIG. 8 is a schematic flowchart of a method for processing hyperspectral images according to another exemplary embodiment of the present invention;

The figures shown are for illustrative purposes only.

DETAILED DESCRIPTION

In order to make the objects, features and advantages of the present invention clearer, embodiments of the present invention will be described in more details. In the following description, many specific details are set forth to facilitate a full understanding of the present invention. However, the present invention can be carried out in many other ways different from the described ones, and therefore, the present invention is not limited to the detailed embodiments disclosed below.

According to an exemplary embodiment of the present invention, a method for processing a hyperspectral image is provided.

Referring to FIG. 4, a flowchart of a method for processing a hyperspectral image according to an exemplary embodiment of the present invention is shown. The method for processing a hyperspectral image comprises: a first correction step for extracting a curve of spectral dimension of an initial spaceborne hyperspectral cube image for low-pass filtering so as to obtain initial correction coefficients; an optimization step for optimizing and compensating the initial correction coefficients according to a ripple period of spatial dimension of a pixel in each band, so as to obtain optimized correction coefficients of the hyperspectral cube image; and a second correction step for obtaining a corrected hyperspectral image based on the optimized correction coefficients. This method allows to effectively remove the spectral dimensional and spatial dimensional interference ripples in the hyperspectral image, and can well maintain the original data characteristics of the hyperspectral image, greatly improving the image quality and definition, and laying a good foundation for subsequent image analysis and application.

Figure 1:
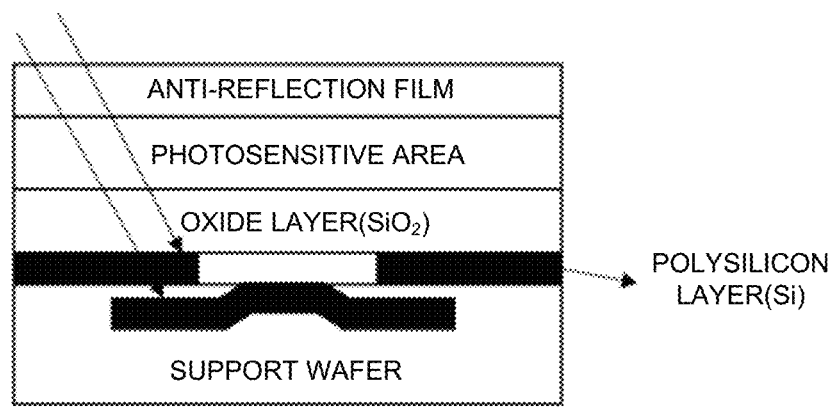
FIG. 1 is a structural schematic diagram of a back-illuminated CCD detector in the prior art.
Figure 2:
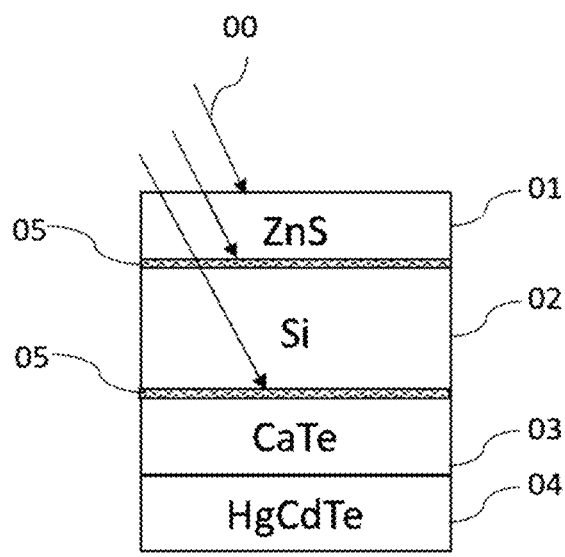
FIG. 2 is a schematic diagram of an internal structure of a HgCdTe focal plane detector in the prior art.
Figure 3:
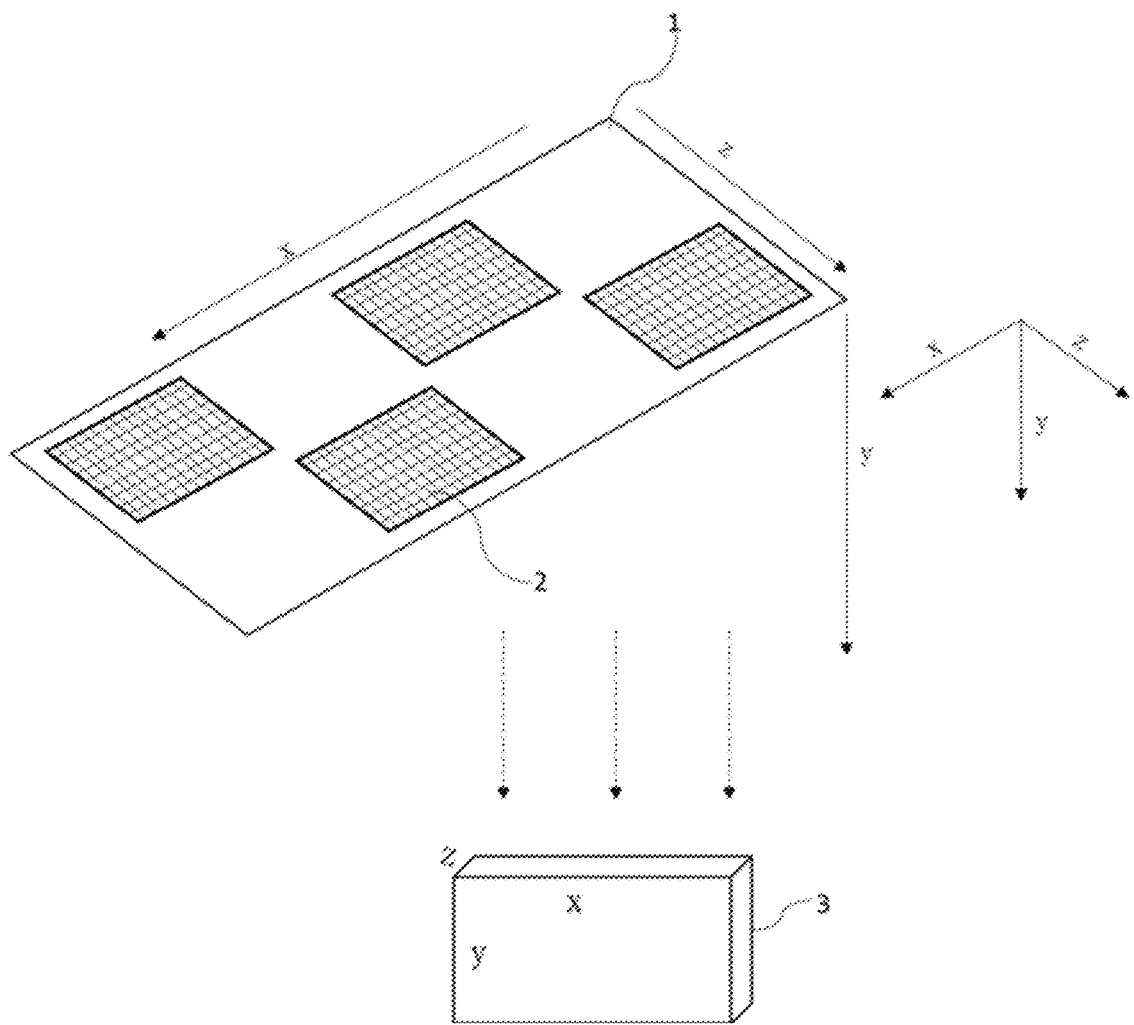
FIG. 3 is a schematic diagram of a structure of a short-wave infrared detector of a hyperspectral camera carried on "Gaofen-5" satellite and its acquiring hyperspectral image data cube in embodiments of the present invention.
Figure 5:
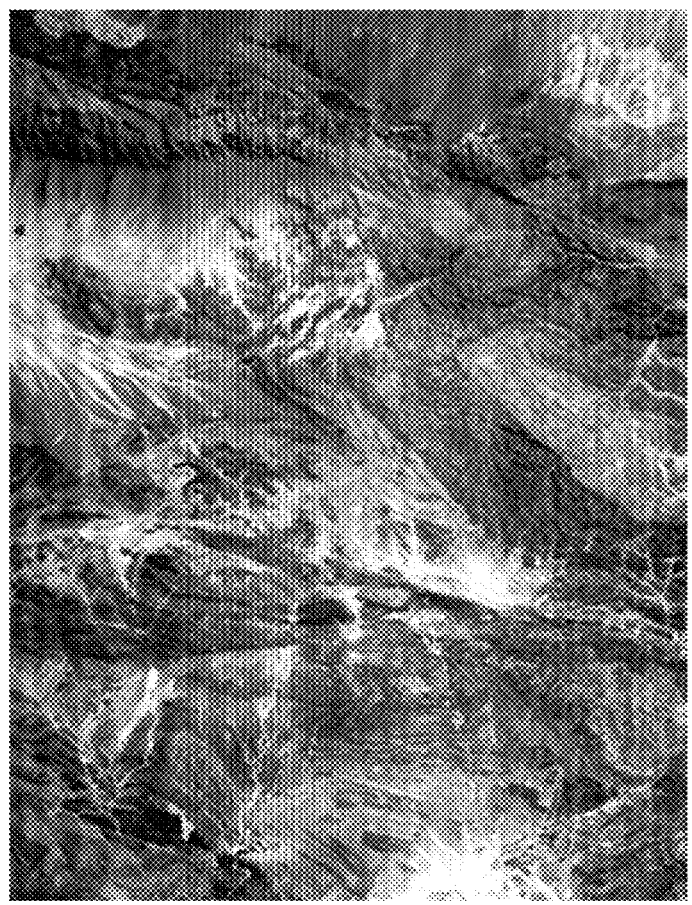
FIG. 5 shows an original hyperspectral image of East Tianshan area of Xinjiang acquired by a short-wave infrared hyperspectral camera carried by the "Gaofen-5" satellite.

As shown in FIG. 3, a detector 1 of a short-wave infrared hyperspectral camera carried by the "Gaofen-5" satellite is formed by splicing four HgCdTe focal plane detectors 2 with 512 pixels each. The maximum of spatial dimensional pixel ordinal number x of the detector is 2048 pixels, the maximum of ordinal number of spectral dimensional band z is 180, the spectral detection range is 1~2.5 μm, the spectral resolution is superior to 10 nm, and the spatial resolution is superior to 30 m. Taking the hyperspectral image 3 obtained by the short-wave infrared hyperspectral camera imager carried by the "Gaofen-5" satellite as an example, a specific implementation is given according to the structural characteristics and functions of the invention:

As shown in FIG. 5, an original hyperspectral image of the East Tianshan area of Xinjiang captured by the "Gaofen-5" satellite's visible short-wave infrared hyperspectral camera on Jun. 1, 2018 is selected in the following for describing the embodiment:

A spectral dimensional curve of the original hyperspectral shortwave image data cube $DN_f(x,y,z)$ of the East Tianshan area of Xinjiang obtained by the "Gaofen-5" satellite's visible shortwave infrared hyperspectral camera is extracted for harmonic decomposition. The spectral dimensional curve is given as: $F(z)=f_1, f_2, \ldots, f_{z\_max}$, where f represents a response value of each band, z represents an ordinal number of the corresponding band, $z=1, 2, 3 \ldots z\_max$, $z\_max$ is a maximum of the ordinal number of spectral dimensional band, which is 180 in the present embodiment. As such, the expansion formula obtained by decomposing the spectral dimensional curve $F(z)=f_1, f_2, \ldots, f_{z\_max}$ for h times is:

$$F(z) = \frac{A_0}{2} + \sum_{h=1}^{\infty}\left[A_h\cos\left(\frac{2\pi hz}{z\_max}\right) + B_h\sin\left(\frac{2\pi hz}{z\_max}\right)\right] =$$

$$\frac{A_0}{2} + \sum_{h=1}^{\infty}\left[C_h\sin\left(\frac{2\pi hz}{z\_max} + \theta_h\right)\right]$$

where the harmonic remainder is $A_0$, the cosine amplitude is $A_h$, the sine amplitude is $B_h$, the harmonic component amplitude is $C_h$ and the harmonic component phase is $\theta_h$. The calculated value of the characteristic component of harmonic energy of the harmonic decomposed $F(z)$ for h times is:

$$\frac{A_0}{2} = \frac{1}{z\_max}\sum_{k=1}^{z\_max} f_z$$

$$A_h = \frac{2}{z\_max}\sum_{k=1}^{z\_max} f_z\cos\frac{2\pi hz}{z\_max}$$

$$B_h = \frac{2}{z\_max}\sum_{k=1}^{z\_max} f_z\sin\frac{2\pi hz}{z\_max}$$

$$C_h = \sqrt{(A_h^2 + B_h^2)}$$

$$\theta_h = \tan^{-1}\frac{A_h}{B_h}$$

the harmonic remainder $$\frac{A_0}{2}$$

represents a mean of responses of the ground object spectrum, $C_h$ and $\theta_h$ represent a change of the response of the spectrum in each band and a band position where the response maximum occurs. After multiple times of harmonic decomposition, the low-order harmonics represent the main characteristics of the spectrum, with the amplitude and phase thereof representing the local characteristic information of the spectrum; while the high-order harmonics often contain noise signals, which appear as an abnormal change in the response values on the spectral curve. Spectral dimensional curves of ice and rock of the original hyperspectral image of the East Tianshan area of Xinjiang obtained by the short-wave infrared hyperspectral camera carried by the "Gaofen-5" satellite are extracted in the following, to find that the spectral dimensional curve extracted from the original hyperspectral short-wave image data cube has obvious ripple phenomenon. The extracted spectral dimensional curves of ice and rock of the original image are harmonic decomposed by 5 times to 100 times respectively, increasing by a sequence of 5 times, and different times of harmonic decompositions are compared and analyzed, then it is found that if the number of times of decomposition is too small (less than 30 times), the spectral curve will easily be over smoothed, and too much spectral characteristics of ground object will be lost; if the number of times of decomposition is too large (more than 60 times), the spectral dimensional ripple cannot be removed well. By comparing the spectral curve after 45 times of harmonic decomposition selected in the present specific embodiment with the original spectral curve, it can be found that the "spectral ripple" caused by the Etalon effect has been greatly suppressed, and the change amount of the corrected spectral curve is 1.82%, 2.75%, thus better retaining the characteristics of the original spectral curve.

After harmonic decomposition, the initially-corrected image data cube $DN_g(x,y,z)$ is obtained, and the initial correction result is analyzed by linear regression minimum value through:

$$\min(DN_g(x,y,z) - \text{Coef}_a \times DN_f(x,y,z) + \text{Coef}_b)^2,$$

to obtain an initial gain correction coefficient $\text{Coef}_a$ and offset correction coefficient $\text{Coef}_b$ of the image, where x is the spatial dimensional pixel ordinal number of the detector, $x=1, 2, 3, \ldots, x\_max$, where $x\_max$ is the maximum of the spatial dimensional pixel ordinal number of the detector, which is 2048 in this specific embodiment; y is the number of sweep lines along the track, $y=1, 2, 3, \ldots, y\_max$, where $y\_max$ is the maximum of the number of sweep lines along the track; z is the ordinal number of spectral dimensional band, $z=1, 2, 3, \ldots, z\_max$, where $z\_max$ is the maximum of the ordinal number of the spectral dimensional band, which is 180 in this specific embodiment.

Figure 6:
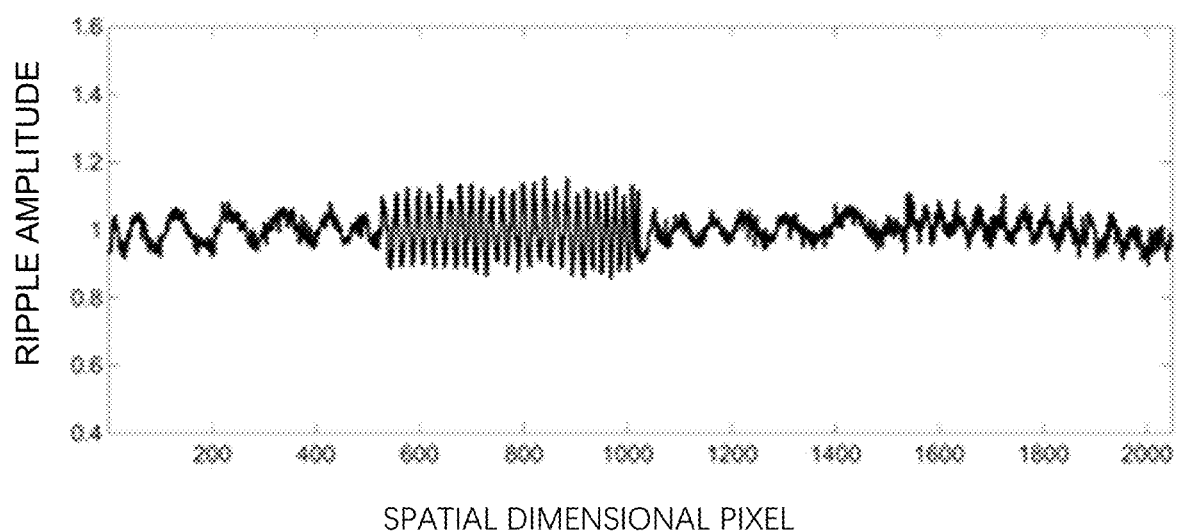
FIG. 6 is a period distribution curve of the spatial dimensional ripple amplitudes in the 160th band of each pixel of the original hyperspectral image of East Tianshan area of Xinjiang acquired by a short-wave infrared hyperspectral camera carried by the "Gaofen-5" satellite.

The method of obtaining the period of spatial dimension ripple for each of the pixels in each band is:
obtaining a distribution curve of spatial dimensional ripple amplitudes for each pixel in each band:

$$\text{Fringe}(x,z) = Q(x,z)/Q(x)$$

according to a ratio of a mean of responses in the direction of track for each pixel in each band:

$$Q(x,z) = \text{mean}(\Sigma_{y=1}^{y\_max} DN_f(x,y,z))$$

to
a mean of responses in the direction of track for each pixel in the full band:

$$Q(x) = \text{mean}(\text{mean}(\Sigma_{z=1}^{z\_max} \Sigma_{y=1}^{y\_max} DN_f(x,y,z))),$$

and drawing the period distribution curve $\text{Fringe}(x, z)$ of the spectral dimensional ripple amplitudes of each pixel of the original hyperspectral image of the East Tianshan area of Xinjiang acquired by a short-wave infrared hyperspectral camera carried by the "Gaofen-5" satellite in each band. An example of the period distribution curve of the spatial-dimensional ripple amplitudes of the pixel in the 160th band will be described below. As shown in FIG. 6, the period T of the spatial-dimensional ripple for the pixel band is obtained, meanwhile the selected number M of the periods for analyzing mean value of the correction coefficients is $$1 \sim \frac{x\_max}{T}.$$

2) Mean values of the initial gain correction coefficient $\text{Coef}_a$ and the initial offset correction coefficient $\text{Coef}_b$ obtained above are respectively analyzed according to the period of spatial dimensional ripple for each pixel in each band, and are used to compensate for the gain correction coefficient $\text{Coef}_a$ and offset correction coefficient $\text{Coef}_b$ on the spectral dimensional data, to obtain the gain correction coefficient $\text{Coef}_a'$ and offset correction coefficient $\text{Coef}_b'$ of the spaceborne hyperspectral image data:

$$\text{Coef}_a' = \text{Coef}_a/\text{mean}(\Sigma_x^{MT+x} \text{Coef}_a)$$

$$\text{Coef}_b' = \text{Coef}_b - \text{mean}(\Sigma_x^{MT+x} \text{Coef}_b)$$

where M is the selected number of periods for analyzing the mean value of the correction coefficients, T is the period of the spatial-dimensional ripple for each pixel in each band.

3) Interference ripple correction is performed on the initial spaceborne hyperspectral image data cube $DN_f(x, y, z)$ to obtain a corrected response value:

$$DN_r(x,y,z) = \text{Coef}_a' \times DN_f(x,y,z) + \text{Coef}_b'$$

the corrected hyperspectral image data cube $DN_r(x, y, z)$ is obtained.

Figure 7:
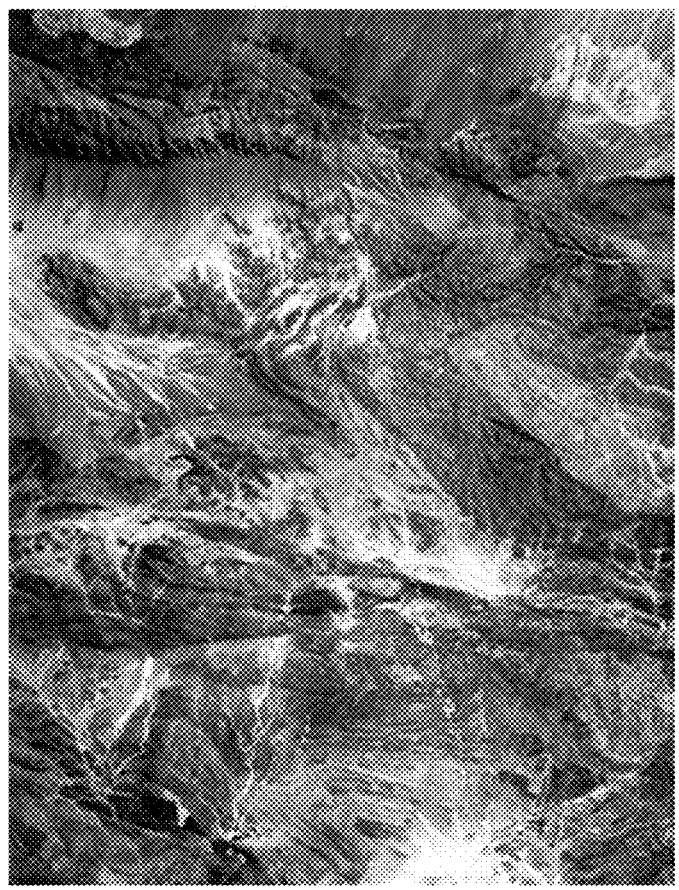
FIG. 7 is a hyperspectral shortwave image of East Tianshan area of Xinjiang corrected by the method of the present invention.

A corrected hyperspectral image of the East Tianshan area of Xinjiang is obtained, as shown in FIG. 7. It can be seen that the interference ripple caused by the Etalon effect has been effectively removed after correction by the method of the present invention, and the data characteristics of the original hyperspectral image are well maintained.

In order to quantitatively evaluate the effectiveness of the method of the present invention, the image quality factor $I_{F2}$ is introduced as the evaluation parameter of the image correction result:

$$I_{F2} = 10 lg \left[ \frac{\sum_x (Q_f(x)[x] - Q_f(x)[x-1])^2}{\sum_x (Q_r(x)[x] - Q_r(x)[x-1])^2} \right]$$

where $Q_f(x)$ is the mean value of the responses in the direction of track for each pixel in the full band before correction, $Q_r(x)$ is the mean value of the responses in the direction of track for each pixel in the full band after correction, x is the spatial dimensional pixel ordinal number of the detector, $x=1, 2, 3, \ldots, x\_max$, where $x\_max$ is the maximum of the spatial dimensional pixel ordinal number of the detector. Selecting the data of the 36th, 94th and 160th bands of the hyperspectral image of the East Tianshan area of Xinjiang, it is found that there is no interference effect in the 36th band, so no correction is performed thereto, while the 94th and 160th bands are greatly affected by the interference fringes, and are corrected according to the traditional Gaussian correction method and the method of the present invention respectively, and the image quality factor $I_{F2}$ described above is introduced to evaluate the results of the images corrected by said two methods respectively, which concludes:

| Band | Image quality factor $I_{F2}$ corrected by traditional Gaussian correction method | Image quality factor $I_{F2}$ corrected by the method of the present invention |
| --- | --- | --- |
| 94 | 11.78 | 20.43 |
| 160 | 10.38 | 22.43 |

It can be seen from the above table that the corrected image quality by the method of the present invention is obviously better than the corrected image by the traditional Gaussian correction method.

Thus, it can be seen that the method for processing a hyperspectral image according to the exemplary embodiment of the present invention can effectively remove the spectral dimensional and spatial dimensional interference ripples existing in the hyperspectral image, well maintain the data characteristics of the original hyperspectral images, and greatly improve image quality and definition, laying a very good foundation for subsequent image analysis and applications.

According to another exemplary embodiment of the present invention, a method for processing a hyperspectral image is further provided.

Referring to FIG. 8, a flowchart of a method for processing a hyperspectral image according to another exemplary embodiment of the present invention is shown. The method comprises: 1) extracting an amplitude distribution curve of spatial interference ripple for a selected band from a hyperspectral image cube data $DN_f(x, y, z)$, and then calculating the number of spatial ripple periods corresponding to the amplitude distribution curve of spatial interference ripple for the band by taking a peak and a valley of the amplitude distribution curve of spatial interference ripple for the band as a spatial ripple period; 2) low-pass filtering the amplitude distribution curve of spatial interference ripple for the band by taking a certain times of the number of spatial ripple periods corresponding to the amplitude distribution curve of spatial interference ripple for the band as a cut-off frequency, to obtain a low-pass filtered amplitude distribution curve of spatial interference ripple for the band; 3) obtaining a fineness coefficient F of ripple curve of Etalon effect for the band: $F=A_{max}/A_{min}-1$, by taking an average value of local maximum points of peaks of the low-pass filtered amplitude distribution curve of spatial interference ripple for the band as a peak value $A_{max}$ of ripple of Etalon effect, and taking an average value of local minimum points of valleys of the low-pass filtered amplitude distribution curve of spatial interference ripple for the band as a valley value $A_{min}$ of the ripple of Etalon effect; 4) fitting all curve values, except for the positions of the peaks and valleys, of the obtained amplitude distribution curve of spatial interference ripple for the band in step 1) by the following formula: $RA=\sqrt{1+F}/(1+F\sin^2(k_p \cdot x + b_p))$, so as to generate the ripple curve of Etalon effect for the band; where RA is a relative absorption rate of a silicon layer of a detector; $k_p$ is a gain coefficient of the interference phase angle generated by incidence of the incident light on the detector, which is a constant coefficient; $b_p$ is an offset coefficient of the interference phase angle generated by incidence of the incident light on the detector, which is a constant coefficient; where x is a spatial dimensional pixel ordinal number of the detector, x=1, 2, 3, . . . , x_max, where x_max is a maximum of the spatial dimensional pixel ordinal number of the detector; y is a number of sweep lines along a track, y=1, 2, 3, . . . , y_max, where y_max is a maximum of sweep lines along the track; z is an ordinal number of spectral dimensional band, z=1, 2, 3, . . . , z_max. The method of the another exemplary embodiment can effectively separate the ripple of Etalon effect out of the interference ripples formed by the mixture of the ripple of Etalon effect and the ripple of non-uniform noise, and can well maintain the original spectral characteristics of the image, thus providing a strong support for improving the image quality through image interference ripple correction, and laying a foundation for subsequent image analysis and applications.

Figure 9:
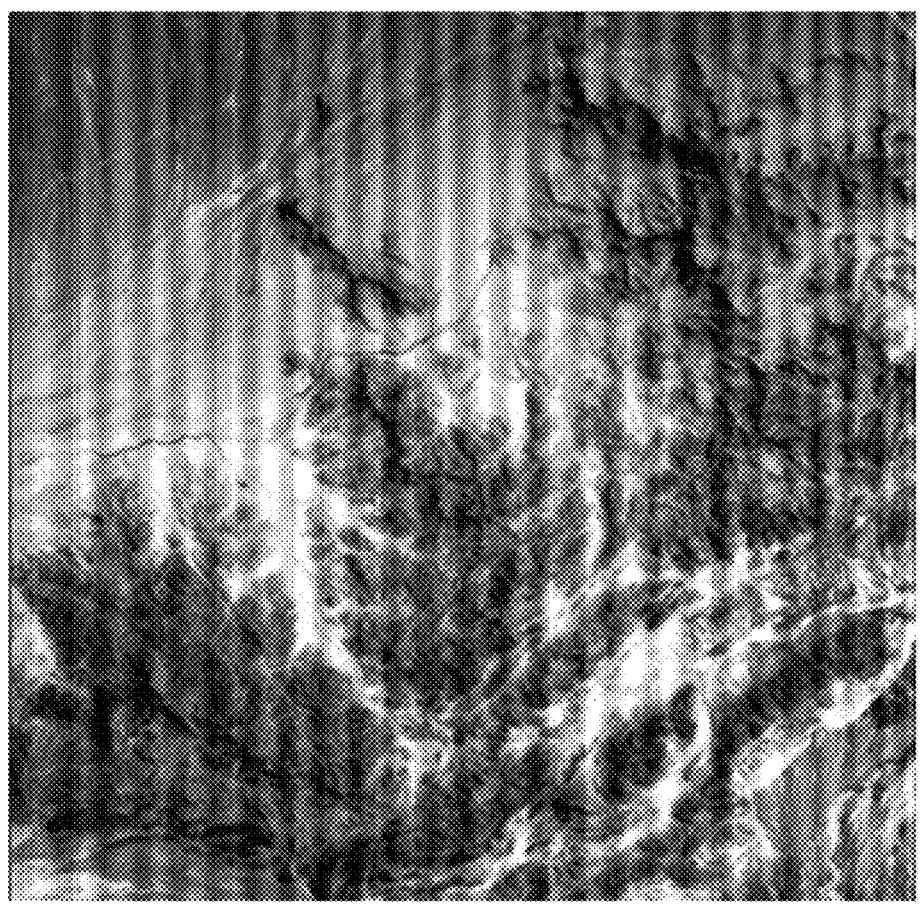
FIG. 9 is a hyperspectral local image of the East Tianshan area of Xinjiang obtained by the hyperspectral camera carried by the "Gaofen-5" satellite.

The short-wave infrared hyperspectral camera imager carried by the "Gaofen-5" satellite has a width of 60 km, a spatial resolution of 30 m and a spectral resolution of 5-10 nm, simultaneously acquiring the spatial, radiative and spectral information of the objects on the ground surface in 330 spectral bands within the range of 400-2500 nm. Its short-wave infrared detection is shown in FIG. 3, which is composed of four spliced HgCdTe focal plane detectors 2 with 512 pixels each. The maximum of spatial dimensional pixel ordinal number x of the detector is 2048 pixels; the maximum of ordinal number of spectral dimensional band z is 180; the short-wave infrared hyperspectral camera imager carried by the "Gaofen-5" satellite has a number y of sweep lines along the track, which can obtain the short-wave infrared hyperspectral image cube data $DN_f(x, y, z)$ 3. The original local hyperspectral image of the east Tianshan area of Xinjiang acquired by sweeping 2814 lines by the visible shortwave infrared hyperspectral camera of the "Gaofen-5" satellite on Jun. 1, 2018 is selected below. As shown in FIG. 9, a specific embodiment is given according to the method of the present invention, in which the image with an ordinal number of spectral dimensional band of 160 in the imaging data has a large interference ripple amplitude caused by the Etalon effect, and the imaging data is affected by the combination of non-uniformity and Etalon effect.

1) By normalizing a ratio of the mean of the responses in the direction of track for each pixel in the 160th band extracted from the hyperspectral image cube data $DN_f(x, y, z)$:

$$Q(x,z) = \text{mean}(\Sigma_{y=1}^{y\_max} DN_f(x,y,z))$$

to the mean of the responses in the direction of track for each pixel in the full band:

$$Q(x) = \text{mean}(\text{mean}(\Sigma_{z=1}^{z\_max} \Sigma_{y=1}^{y\_max} DN_f(x,y,z))),$$

an amplitude distribution curve of spatial dimensional ripple corresponding to that band is obtained:

$$\text{Fringe}(x, z) = \text{norm}\left(\frac{Q(x, z)}{Q(x)}\right)$$

Figure 10:
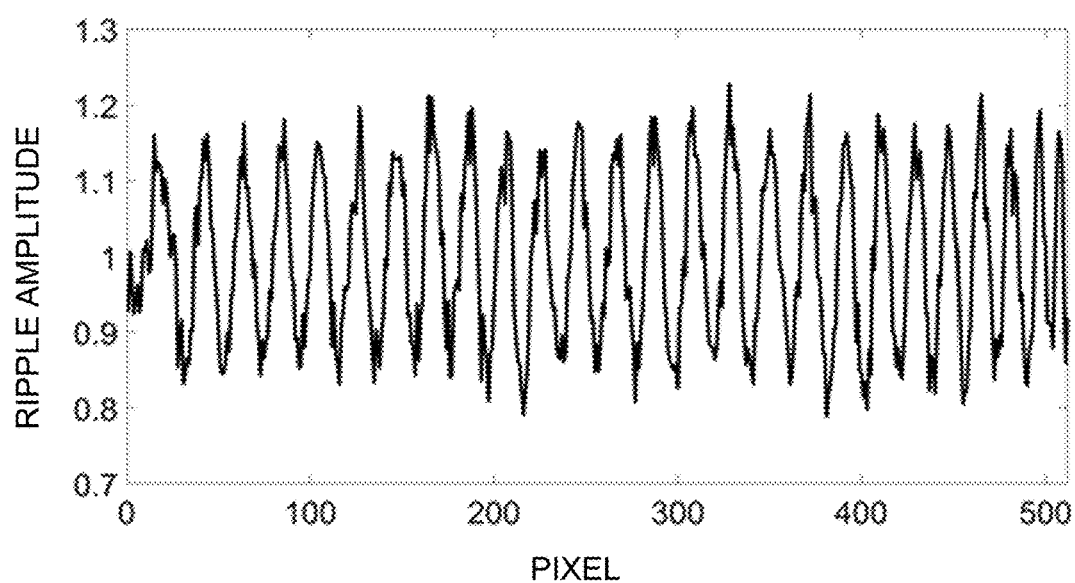
FIG. 10 is a distribution curve of spatial interference ripple amplitudes corresponding to the 160-band of the hyperspectral local image of the East Tianshan area of Xinjiang obtained by the hyperspectral camera carried by the "Gaofen-5" satellite.

What is shown in FIG. 10 is the amplitude distribution curve of the spatial interference ripple corresponding to the 160th band, which is a ripple curve of the ripple of non-uniform noise and the ripple of Etalon effect. The distribution of the stripe range is not uniform, with obvious high-frequency stripe noise, and the ripple amplitudes of adjacent pixels vary greatly, without obvious regularity.

Here, mean( ) represents the operation of acquiring a mean, norm( ) represents the operation of normalization; x is a spatial dimensional pixel ordinal number of the detector, x=1, 2, 3, . . . , x_max, where x_max is a maximum of the spatial dimensional pixel ordinal number of the detector; y is the number of sweep lines along a track, y=1, 2, 3, . . . , y_max, where y_max is a maximum of sweep lines along the track; z is an ordinal number of spectral dimensional band, z=1, 2, 3, . . . , z_max, where z_max is a maximum of the ordinal number of spectral dimensional band. Then, the number of spatial ripple periods corresponding to the amplitude distribution curve of spatial interference ripple for each band is calculated to be 26, by taking a peak and a valley of the amplitude distribution curve of spatial interference ripple for each band as a spatial ripple period.

Figure 11:
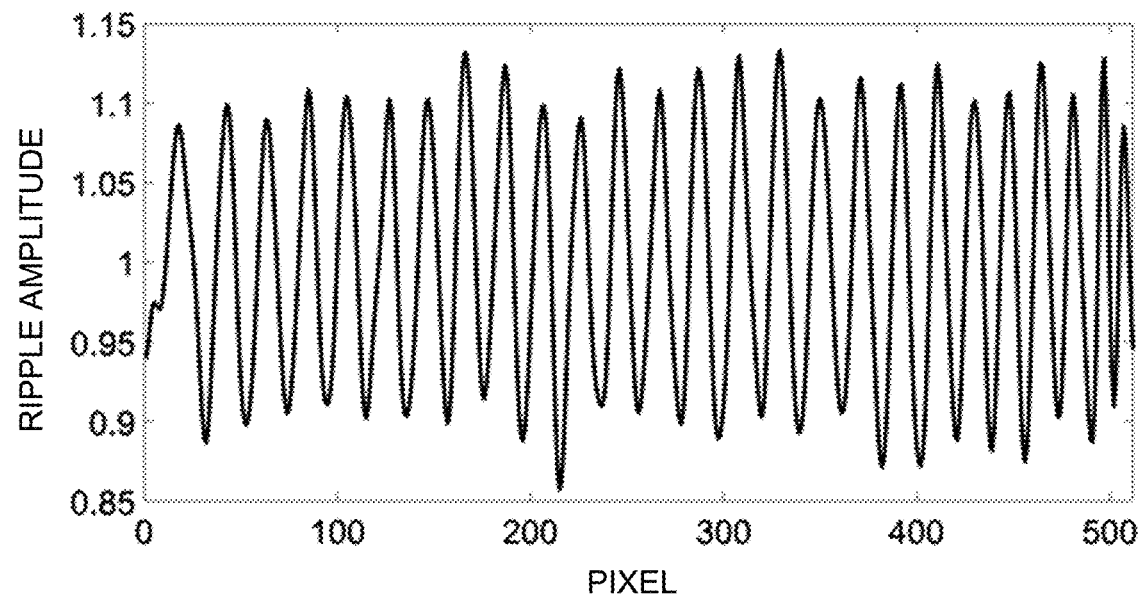
FIG. 11 is a distribution curve of spatial interference ripple amplitudes corresponding to the 160-band of a low-pass filtered hyperspectral local image of the East Tianshan area of Xinjiang obtained by the hyperspectral camera carried by the "Gaofen-5" satellite.

2) The amplitude distribution curve of spatial interference ripple for each band is low-pass filtered by taking 2.5 times of the number of spatial ripple periods corresponding to the amplitude distribution curve of spatial interference ripple for each band (which is 26), i.e., 65, as a cut-off frequency, to obtain a low-pass filtered amplitude distribution curve of spatial interference ripple for each band, as shown in FIG. 11, which is a low-pass filtered amplitude distribution curve of spatial interference ripple corresponding to the 160th band, in which the low-pass filtered curve is smoother in the details, and the degree of amplitude variation is relatively low, which is more in line with the distribution characteristics of the Etalon effect.

3) A fineness coefficient F of ripple curve of Etalon effect for each band can be obtained:

$$F = A_{max}/A_{min} - 1,$$

by taking an average value of local maximum points of peaks (i.e., all the peak points in the curve whose peak values are greater than or equal to the peak values of the 4 adjacent peaks thereof) of the low-pass filtered amplitude distribution curve of spatial interference ripple for each band as a peak value $A_{max}$ of ripple of Etalon effect, and taking an average value of local minimum points of valleys (i.e., all the valley points in the curve whose valley values are less than or equal to the valley values of the 4 adjacent valleys thereof) of the low-pass filtered amplitude distribution curve of spatial interference ripple for each band as a valley value $A_{min}$ of the ripple of Etalon effect.

Figure 12:
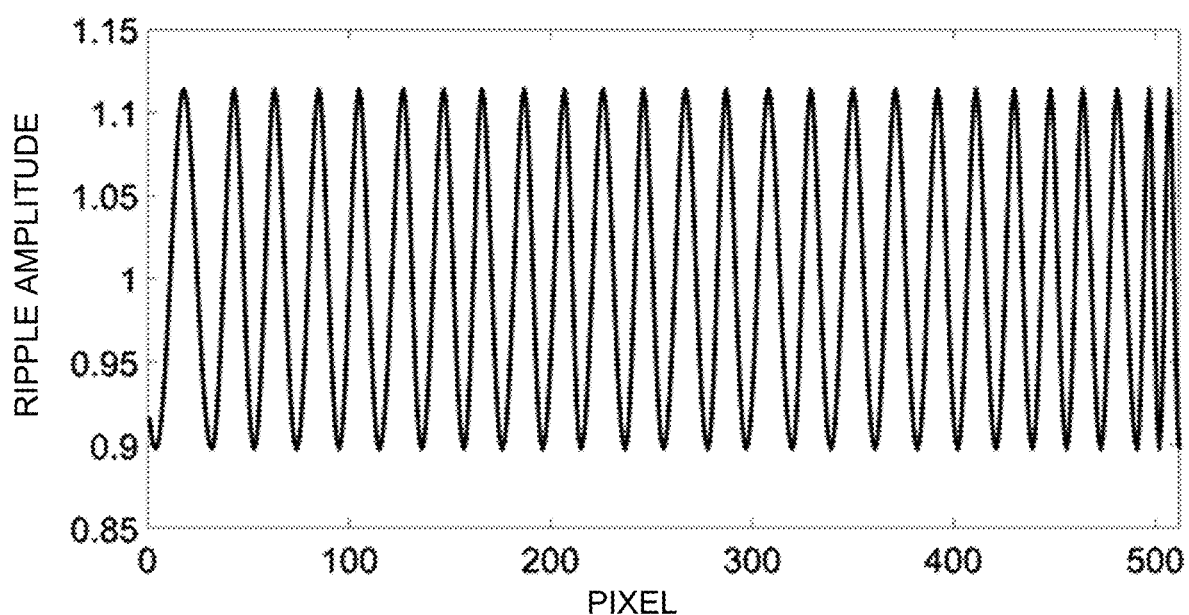
FIG. 12 is a ripple curve of Etalon effect for the 160-band generated by fitting the hyperspectral local image of the East Tianshan area of Xinjiang obtained by the hyperspectral camera carried by the "Gaofen-5" satellite.

Finally, all the curve values, except for the positions of the peaks and valleys, of the amplitude distribution curve of spatial interference ripple for each band are fitted by the formula $$RA = \sqrt{1+F}/(1+F\sin^2(k_p \cdot x + b_p))$$

so as to generate the ripple curve of Etalon effect for each band. FIG. 12 shows the ripple curve of Etalon effect for the 160th band generated through fitting, which has a very good consistency of the maximum amplitude of each period, which overcomes the problem that some pixels only reflect the spectral characteristics of specific ground objects and the influence of non-uniformity of the pixels, with close ripple amplitudes of adjacent pixels, a wider stripe range, which has obvious regularity.

Here, RA is a relative absorption rate of a silicon layer of a detector; $k_p$ is a gain coefficient of the interference phase angle generated by incidence of the incident light on the detector, which is a constant coefficient; $b_p$ is an offset coefficient of the interference phase angle generated by incidence of the incident light on the detector, which is a constant coefficient; where x is a spatial dimensional pixel ordinal number of the detector, x=1, 2, 3, . . . , x_max, where x_max is a maximum of the spatial dimensional pixel ordinal number of the detector; y is a number of sweep lines along a track, y=1, 2, 3, . . . , y_max, where y_max is a maximum of sweep lines along the track; z is an ordinal number of spectral dimensional band, z=1, 2, 3, . . . , z_max.

Thus, it can be seen that the method for processing a hyperspectral image according to the another exemplary embodiment of the present invention can effectively separate the ripple of Etalon effect out of the interference ripples formed by the mixture of ripple of Etalon effect and ripple of non-uniform noise, and can maintain the original spectral characteristics of the image very well, thus providing a strong support for improving the image quality through image interference ripple correction, and laying a foundation for subsequent image analysis and applications.

The following examples relate to embodiments according to the Description.

Example 1 is a correction method for interference ripple of a spaceborne hyperspectral infrared image, which extracts a curve of spectral dimension of an initial spaceborne hyperspectral cube image for low-pass filtering so as to obtain initial correction coefficients, then optimizes and compensates the initial correction coefficients according to the ripple period of spatial dimension of the pixel in each band, so as to obtain the correction coefficients of the hyperspectral cube image and a corrected hyperspectral image, which specifically comprises:

1) extracting a curve of spectral dimension of an initial spaceborne hyperspectral image data cube $DN_f(x,y,z)$ for low-pass filtering, correcting the interference ripple on the spectral dimensional data to obtain an initially-corrected image data cube $DN_g(x,y,z)$, and analyzing the initial correction result by linear regression minimum value:

$$\min(DN_g(x,y,z) - \text{Coef}_a \times DN_f(x,y,z) + \text{Coef}_b)^2$$

to obtain an initial gain correction coefficient $\text{Coef}_a$ and an offset correction coefficient $\text{Coef}_b$ of the image, where x is the spatial dimensional pixel ordinal number of the detector, x=1, 2, 3, . . . , x_max, where x_max is the maximum of the spatial dimensional pixel ordinal number of the detector; y is the number of sweep lines along the track, y=1, 2, 3, . . . , y_max, where y_max is the maximum of the number of sweep lines along the track; z is the ordinal number of spectral dimensional band, z=1, 2, 3, . . . , z_max, where z_max is the maximum of the ordinal number of the spectral dimensional band;

2) respectively analyzing mean values of the initial gain correction coefficient $\text{Coef}_a$ and the initial offset correction coefficient $\text{Coef}_b$ obtained above according to the period of spatial dimensional ripple for each pixel in each band, which are then used to compensate for the gain correction coefficient $\text{Coef}_a$ and offset correction coefficient $\text{Coef}_b$ on the spectral dimensional data, to obtain the gain correction coefficient $\text{Coef}_a'$ and offset correction coefficient $\text{Coef}_b'$ of the spaceborne hyperspectral image data:

$$\text{Coef}_a' = \text{Coef}_a/\text{mean}(\Sigma_x^{MT+x}\text{Coef}_a)$$

$$\text{Coef}_b' = \text{Coef}_b - \text{mean}(\Sigma_x^{MT+x}\text{Coef}_b)$$

where M is the selected number of periods for analyzing the mean value of the correction coefficients, T is the period of the spatial-dimensional ripple for each pixel in each band;

3) performing interference ripple correction on the initial spaceborne hyperspectral image data cube $DN_f(x, y, z)$ to obtain a corrected response value:

$$DN_r(x,y,z) = \text{Coef}_a' \times DN_f(x,y,z) + \text{Coef}_b'$$

to obtain the corrected hyperspectral image data cube $DN_f(x, y, z)$.

Example 2 may include at least a part of the subject matter of Example 1, wherein the period of spatial dimensional ripple for each pixel in each band is obtained by:
  obtaining a distribution curve of spatial dimensional ripple amplitudes for each pixel in each band:

Fringe$(x,z)=Q(x,z)/Q(x)$ according to a ratio of a mean of responses in the direction of track for each pixel in each band:

$Q(x,z)=\text{mean}(\Sigma_{y=1}^{y\_max} DN_f(x,y,z))$ to
  a mean of responses in the direction of track for each pixel in the full band:

$Q(x)=\text{mean}(\text{mean}(\Sigma_{z=1}^{z\_max}\Sigma_{y=1}^{y\_max} DN_f(x,y,z)))$, and determining the period T of spatial dimension ripple for each pixel in each band according to the pattern of the distribution curve;
  where x is the spatial dimensional pixel ordinal number of the detector, x=1, 2, 3, ..., x_max, where x_max is the maximum of the spatial dimensional pixel ordinal number of the detector; y is the number of sweep lines along the track, y=1, 2, 3, ..., y_max, where y_max is the maximum of the number of sweep lines along the track; z is the ordinal number of spectral dimensional band, z=1, 2, 3, ..., z_max, where z_max is the maximum of the ordinal number of the spectral dimensional band; $DN_f(x, y, z)$ is the initial spaceborne hyperspectral image data cube.

Example 3 may include at least a part of the subject matter of Example 1 or 2, wherein the selected number M of the periods for analyzing mean value of the correction coefficients is $$1 \sim \frac{x\_max}{T},$$

where x is the spatial dimensional pixel ordinal number of the detector, x=1, 2, 3, ..., x_max, where x_max is the maximum of the spatial dimensional pixel ordinal number of the detector; T is the period of spatial dimension ripple for each pixel in each band.

Example 4 may include at least a part of the subject matter of Example 1, wherein the method for performing low-pass filtering on the curve of spectral dimension is preferably a harmonic decomposition method.

Example 5 is a separation method of ripple of Etalon effect of a hyperspectral image, which comprises:
  1) extracting an amplitude distribution curve of spatial interference ripple for a selected band from a hyperspectral image cube data $DN_f(x, y, z)$, and then calculating the number of spatial ripple periods corresponding to the amplitude distribution curve of spatial interference ripple for the band by taking a peak and a valley of the amplitude distribution curve of spatial interference ripple for the band as a spatial ripple period;
  2) low-pass filtering the amplitude distribution curve of spatial interference ripple for the band by taking a certain times of the number of spatial ripple periods corresponding to the amplitude distribution curve of spatial interference ripple for the band as a cut-off frequency, to obtain a low-pass filtered amplitude distribution curve of spatial interference ripple for the band;
  3) and obtaining a fineness coefficient F of ripple curve of Etalon effect for the band:

$F=A_{max}/A_{min}-1$, by taking an average value of local maximum points of peaks of the low-pass filtered amplitude distribution curve of spatial interference ripple for the band as a peak value $A_{max}$ of ripple of Etalon effect, and taking an average value of local minimum points of valleys of the low-pass filtered amplitude distribution curve of spatial interference ripple for the band as a valley value $A_{min}$ of the ripple of Etalon effect;
  finally fitting all curve values, except for the positions of the peaks and valleys, of the obtained amplitude distribution curve of spatial interference ripple for the band in step 1) by the following formula:

$RA=\sqrt{1+F}/(1+F\sin^2(k_p \cdot x+b_p))$ so as to generate the ripple curve of Etalon effect for the band; where RA is a relative absorption rate of a silicon layer of a detector; $k_p$ is a gain coefficient of the interference phase angle generated by incidence of the incident light on the detector, which is a constant coefficient; $b_p$ is an offset coefficient of the interference phase angle generated by incidence of the incident light on the detector, which is a constant coefficient; where x is a spatial dimensional pixel ordinal number of the detector, x=1, 2, 3, ..., x_max, where x_max is a maximum of the spatial dimensional pixel ordinal number of the detector; y is a number of sweep lines along a track, y=1, 2, 3, ..., y_max, where y_max is a maximum of sweep lines along the track; z is an ordinal number of spectral dimensional band, z=1, 2, 3, ..., z_max.

Example 6 may include at least a part of the subject matter of Example 5, wherein the amplitude distribution curve of spatial interference ripple for the selected band:

$$\text{Fringe}(x, z) = \text{norm}\left(\frac{Q(x, z)}{Q(x)}\right)$$

is obtained by normalizing a ratio of the mean of the responses in the direction of track for each pixel in the band extracted from the hyperspectral image cube data $DN_f(x, y, z)$:

$Q(x,z)=\text{mean}(\Sigma_{y=1}^{y\_max} DN_f(x,y,z))$ to the mean of the responses in the direction of track for each pixel in the full band:

$Q(x)=\text{mean}(\text{mean}(\Sigma_{z=1}^{z\_max}\Sigma_{y=1}^{y\_max} DN_f(x,y,z)))$, where Fringe(x, z) represents the amplitude distribution curve of spatial interference ripple for the band; mean( ) represents the operation of acquiring a mean, norm( ) represents the operation of normalization; x is a spatial dimensional pixel ordinal number of the detector, x=1, 2, 3, ..., x_max, where x_max is a maximum of the spatial dimensional pixel ordinal number of the detector; y is the number of sweep lines along a track, y=1, 2, 3, ..., y_max, where y_max is a maximum of sweep lines along the track; z is an ordinal number of spectral dimensional band, z=1, 2, 3, ..., z_max, where z_max is a maximum of the ordinal number of spectral dimensional band.

Example 7 may include at least a part of the subject matter of Example 5, wherein a value range of the certain times is preferably 1 to 5 times.

Example 8 may include at least a part of the subject matter of Example 5, wherein the local maximum points of peaks are all the peak points within the low-pass filtered curve of spatial interference ripple whose peak values are greater than or equal to the peak values of the M adjacent peaks thereof for the band, having an average value which is the peak value $A_{max}$ of ripple of Etalon effect.

Example 9 may include at least a part of the subject matter of Example 5, wherein the local minimum points of valleys are all the valley points within the low-pass filtered curve of spatial interference ripple whose valley values are less than or equal to the valley values of the M adjacent valleys thereof for the band, having an average value which is a valley value $A_{min}$ of the ripple of Etalon effect.

Example 10 may include at least a part of the subject matter of Example 5, wherein a value range of the M is preferably 1~10.

The foregoing is only the preferred embodiments of the present invention, and is not intended to limit the scope of the present invention. Any modification, equivalent replacement, improvement, etc. made within the spirit and principles of the present invention should be included in the scope of the present invention.

What is claimed is:

1. A method for processing a hyperspectral image, comprising:
   1) obtaining, via an infrared detector, the hyperspectral image, wherein the infrared detector comprises multiple dielectric layers including a silicon layer and a plurality of pixels;
   2) extracting an amplitude distribution curve of spatial interference ripple for a selected band from a hyperspectral image cube data $DN_f(x, y, z)$, and then calculating the number of spatial ripple periods corresponding to the amplitude distribution curve of spatial interference ripple for the band by taking a peak and a valley of the amplitude distribution curve of spatial interference ripple for the band as a spatial ripple period;
   3) low-pass filtering the amplitude distribution curve of spatial interference ripple for the band by taking a certain times of the number of spatial ripple periods corresponding to the amplitude distribution curve of spatial interference ripple for the band as a cut-off frequency, to obtain a low-pass filtered amplitude distribution curve of spatial interference ripple for the band;
   4) obtaining a fineness coefficient F of ripple curve of Etalon effect for the band: $F=A_{max}/A_{min}-1$, by taking an average value of local maximum points of peaks of the low-pass filtered amplitude distribution curve of spatial interference ripple for the band as a peak value $A_{max}$ of ripple of Etalon effect, and taking an average value of local minimum points of valleys of the low-pass filtered amplitude distribution curve of spatial interference ripple for the band as a valley value $A_{min}$ of the ripple of Etalon effect;
   5) fitting all curve values, except for the positions of the peaks and valleys, of the obtained amplitude distribution curve of spatial interference ripple for the band in step 1) by the following formula:

$$RA=\sqrt{1+F}/(1+F\sin^2(k_p \cdot x+b_p)),$$

so as to generate a ripple curve of Etalon effect for the band; where RA is a relative absorption rate of the silicon layer of the infrared detector; $k_p$ is a gain coefficient of an interference phase angle generated by incidence of an incident light on the infrared detector, which is a constant coefficient; $b_p$ is an offset coefficient of the interference phase angle generated by incidence of the incident light on the infrared detector, which is a constant coefficient; where x is a spatial dimensional pixel ordinal number of the infrared detector, x=1, 2, 3, . . . , x_max, where x_max is a maximum of the spatial dimensional pixel ordinal number of the detector; y is the number of sweep lines along a track, y=1, 2, 3, . . . , y_max, where y_max is a maximum of sweep lines along the track; z is an ordinal number of spectral dimensional band, z=1, 2, 3, . . . , z_max.

2. The method of claim 1, wherein the amplitude distribution curve of spatial interference ripple for the selected band:

$$\text{Fringe}(x, z) = \text{norm}\left(\frac{Q(x, z)}{Q(x)}\right),$$

is obtained by normalizing a ratio of a mean of responses in the direction of track for each pixel in the band extracted from the hyperspectral image cube data $DN_f$ (x, y, z):

$$Q(x,z)=\text{mean}(\Sigma_{y=1}^{y\_max}DN_f(x,y,z))$$

to a mean of responses in the direction of track for each pixel in the full band:

$$Q(x)=\text{mean}(\text{mean}(\Sigma_{z=1}^{z\_max}\Sigma_{y=1}^{y\_max}DN_f(x,y,z))),$$

where Fringe (x, z) represents the amplitude distribution curve of spatial interference ripple for the band; mean ( ) represents the operation of acquiring a mean, norm ( ) represents the operation of normalization; x is a spatial dimensional pixel ordinal number of the infrared detector, x=1, 2, 3, . . . , x_max, where x_max is a maximum of the spatial dimensional pixel ordinal number of the infrared detector; y is the number of sweep lines along the track, y=1, 2, 3, . . . , y_max, where y_max is a maximum of sweep lines along the track; z is an ordinal number of spectral dimensional band, z=1, 2, 3, . . . , z_max, where z_max is a maximum of the ordinal number of spectral dimensional band.

3. The method of claim 1, wherein a value range of the certain times is 1 to 5 times.

4. The method of claim 1, wherein the local maximum points of peaks are all the peak points within the low-pass filtered curve of spatial interference ripple whose peak values are greater than or equal to those of M adjacent peaks thereof for the band, having an average value which is the peak value $A_{max}$ of ripple of Etalon effect.

5. The method of claim 1, wherein the local minimum points of valleys are all the valley points within the low-pass filtered curve of spatial interference ripple whose valley values are less than or equal to those of M adjacent valleys thereof for the band, having an average value which is a valley value $A_{min}$ of the ripple of Etalon effect.

6. The method of claim 4, wherein a value range of the M is 1~10.

* * * * *